(12) United States Patent
Douglas et al.

(10) Patent No.: US 9,864,718 B2
(45) Date of Patent: Jan. 9, 2018

(54) PHYSICAL LAYER NETWORK INTERFACE MODULE (PHY-NIM) ADAPTATION SYSTEM

(71) Applicant: International Business Machines Corporation, Armonk, NY (US)

(72) Inventors: James G. Douglas, Pine Island, MN (US); James A. Heiberger, Alpharetta, GA (US); Seth D. Lewis, Rochester, MN (US); Robert L. Martin, III, Dallas, GA (US); Todd D. Podhaisky, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/452,353

(22) Filed: Mar. 7, 2017

(65) Prior Publication Data
US 2017/0177535 A1   Jun. 22, 2017

Related U.S. Application Data

(63) Continuation of application No. 14/533,704, filed on Nov. 5, 2014.

(51) Int. Cl.
  *G06F 13/40* (2006.01)
  *G06F 13/36* (2006.01)
  *G06F 13/42* (2006.01)

(52) U.S. Cl.
  CPC .......... *G06F 13/4068* (2013.01); *G06F 13/36* (2013.01); *G06F 13/4022* (2013.01); *G06F 13/4027* (2013.01); *G06F 13/4282* (2013.01); *G06F 2213/0026* (2013.01)

(58) Field of Classification Search
  None
  See application file for complete search history.

(56) References Cited

U.S. PATENT DOCUMENTS

| | | |
|---|---|---|
| 7,203,174 B2 | 4/2007 | Huff |
| 7,285,022 B2 | 10/2007 | Shtargot et al. |
| 7,688,728 B2 | 3/2010 | Ardhanari et al. |

(Continued)

FOREIGN PATENT DOCUMENTS

CN     202364230 U     8/2012

OTHER PUBLICATIONS

Netgear, Fast Ethernet Switch, 2004, pp. 1-4.*

(Continued)

*Primary Examiner* — Cheng-Yuan Tseng
(74) *Attorney, Agent, or Firm* — Lee Law, PLLC; Christopher B. Lee

(57) ABSTRACT

A physical layer network interface module (PHY-NIM) adaptation system provides a PHY-NIM device and an attachable media access control (MAC) device. The PHY-NIM device interconnects with the attachable MAC device and the attachable MAC device interconnects to a network appliance to provide at least one of network switch capabilities and MAC device capabilities for use by the network appliance. The PHY-NIM device interconnects directly to the network appliance where the network appliance has at least one of an internal network switch and an internal MAC device in a southbridge input/output (I/O) interface chip of the network appliance.

7 Claims, 1 Drawing Sheet

(56) References Cited

U.S. PATENT DOCUMENTS

| | | |
|---|---|---|
| 8,050,287 B2 | 11/2011 | Logvinov et al. |
| 8,295,185 B2 | 10/2012 | Binder |
| 8,301,821 B2 | 10/2012 | Ihle et al. |
| 8,553,720 B2 | 10/2013 | Bishara et al. |
| 2006/0215626 A1 | 9/2006 | Ross |
| 2012/0314716 A1 | 12/2012 | Barkan et al. |
| 2013/0163604 A1 | 6/2013 | Kondapalli et al. |
| 2015/0261710 A1* | 9/2015 | Billi .................. G06F 13/4022 710/316 |
| 2016/0124887 A1 | 5/2016 | Douglas et al. |

OTHER PUBLICATIONS

United States Patent and Trademark Office, Notice of Allowance for U.S. Appl. No. 14/533,704, dated Dec. 13, 2017, pp. 1-11, Alexandria, VA, USA.

IBM, List of IBM Patents or Patent Applications Treated as Related, Applicant Appendix, Mar. 7, 2017, pp. 1-2, the contents of which are incorporated herein by reference in their entirety.

* cited by examiner

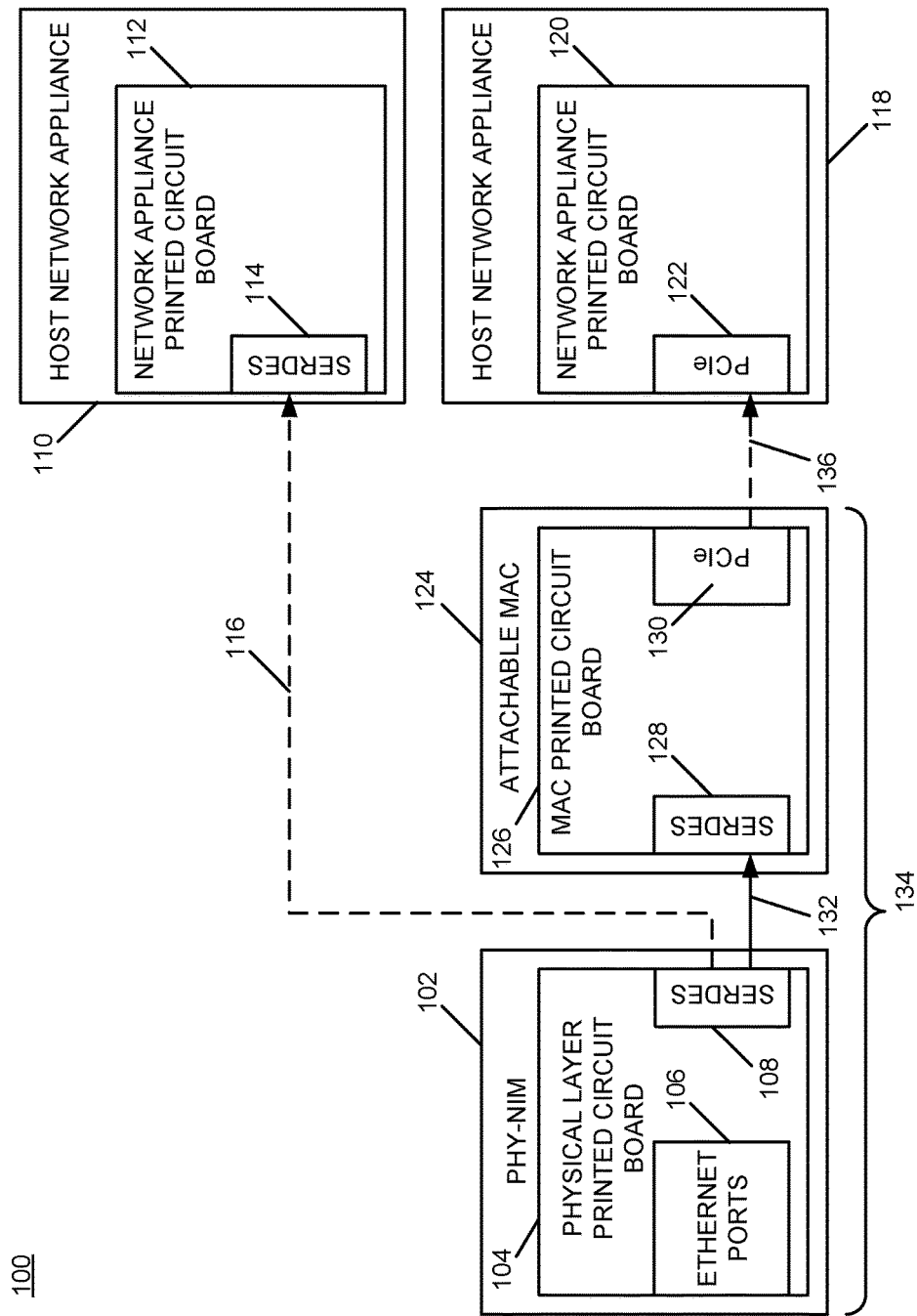

PHYSICAL LAYER NETWORK INTERFACE MODULE (PHY-NIM) ADAPTATION SYSTEM

BACKGROUND

The present invention relates to network interface module design. More particularly, the present invention relates to a physical layer network interface module (PHY-NIM) adaptation system.

Computer networks allow computing devices to communicate with other computing devices. Users of the computing devices may send messages, such as electronic mail messages, to one another using a computer network.

SUMMARY

A physical layer network interface module (PHY-NIM) adaptation system includes: a PHY-NIM device; an attachable media access control (MAC) device; and where the PHY-NIM device interconnects with the attachable MAC device and the attachable MAC device interconnects to a network appliance to provide at least one of network switch capabilities and MAC device capabilities for use by the network appliance; and where the PHY-NIM device interconnects directly to the network appliance where the network appliance comprises at least one of an internal network switch and an internal MAC device in a southbridge input/output (I/O) interface chip of the network appliance.

A physical layer network interface module (PHY-NIM) device includes: at least one Ethernet port that provides physical network layer connectivity; a serializer/deserializer (SerDes) interconnection; and where the SerDes interconnection: provides connectivity of the PHY-NIM device to an attachable media access control (MAC) device and the attachable MAC device interconnects to a network appliance to provide at least one of network switch capabilities and MAC device capabilities for use by the network appliance; and provides connectivity of the PHY-NIM device directly to the network appliance without the attachable MAC device where the network appliance comprises at least one of an internal network switch and an internal MAC device in a southbridge input/output (I/O) interface chip of the network appliance.

A media access control (MAC) device includes: a serializer/deserializer (SerDes) interconnection; a peripheral component interconnection express (PCIe) interconnection; and where: the MAC device interconnects using the SerDes interconnection as an attachable MAC device to a physical layer network interface module (PHY-NIM) device, and the MAC device with the interconnected PHY-NIM device interconnect as a unit to a network appliance to provide at least one of network switch capabilities and MAC device capabilities for use by the network appliance; and the MAC device is directly connectable to the network appliance via the PCIe interconnection to interconnect the unit to the network appliance.

BRIEF DESCRIPTION OF THE DRAWINGS

The FIGURE is a block diagram of an example of an implementation of a physical layer network interface module (PHY-NIM) adaptation system according to an embodiment of the present subject matter.

DETAILED DESCRIPTION

The examples set forth below represent the necessary information to enable those skilled in the art to practice the invention and illustrate the best mode of practicing the invention. Upon reading the following description in light of the accompanying drawing FIGURE, those skilled in the art will understand the concepts of the invention and will recognize applications of these concepts not particularly addressed herein. It should be understood that these concepts and applications fall within the scope of the disclosure and the accompanying claims.

The subject matter described herein provides a physical layer network interface module (PHY-NIM) adaptation system. The present technology provides a PHY-NIM device with a separate attachable media access control (MAC) device that allows the single PHY-NIM device/design to be reused across platforms. The PHY-NIM device may be connected to network appliances that do not have an internal MAC device by use of the attachable MAC device. Additionally, the same PHY-NIM device may be connected to network appliances that do have an internal MAC device by direct connection of the PHY-NIM device to the network appliance. As such, cost savings, improved design reuse, and increased network appliance to PHY-NIM connectivity options may achieved by use of the present technology.

The PHY-NIM device may be designed for a particular network link speed. For example, network link speeds for which the PHY-NIM device may be designed may include one gigabit per second (1 G), ten gigabit per second (10 G), forty gigabit per second (40 G), and one hundred gigabit per second (100 G). For the network interconnection, the PHY-NIM device may also be designed with different connector form factors, such as RJ-45, small form-factor pluggable (SFP), SFP for 10 G (SFP+), Quad SFP (QSFP), and a 100 G form factor pluggable (CFP/CFP2/CFP4). For connection to a network appliance, the PHY-NIM device may be designed with a serializer/deserializer (SerDes) interconnection. As described in more detail below, the SerDes interconnection may be used to interconnect the PHY-NIM device directly to a SerDes interface of a host network appliance designed with a SerDes interface. Alternatively, the PHY-NIM device may be interconnected to a host network appliance designed with a peripheral component interconnection express (PCIe) interface by attachment of a MAC device that has both a SerDes interconnection and a PCIe interconnection.

Different types of attachable MAC devices with different internal electronic components to support certain PHY-NIM devices may also be designed. For example, a network switch, network flow processor, or other hardware accelerated packet processing device may be designed.

It should be noted that conception of the present subject matter resulted from recognition of certain limitations associated with computer networking hardware design. For example, it was observed that modular hardware design conventionally incorporates all functionality to perform a particular task into a single package. It was observed that this previous technique of modular design was believed to reduce costs and item stocking codes. However, it was observed that there are situations where the conventional incorporation of all functionality to perform a particular task into a single package results in increased costs because multiple different designs have to be created to account for network interface modules that may not connect to or function with certain network appliances. For example, it was observed that certain network appliance platforms contain an internal network switch or media access control (MAC) devices integrated into a southbridge chip that handles input/output (I/O) functions as part of a chipset. The southbridge chip, in conjunction with a northbridge chip, interfaces different I/O platforms with a central processing unit (CPU) of a computing architecture. However, it was further observed that not all network appliance platforms contain these internal network switches or MAC devices integrated into the southbridge chip-set. As such, if a network appliance has its own internal network switch or MAC device as part of its modular design, and a conventional PHY-NIM device also has its own MAC device as part of its single-packaged modular design, then these two "modular" devices would not be able to be connected due to signaling and connector incompatibilities at the device interface level. From this, it was further determined that this incompatibility results in a network appliance that cannot be connected to a physical network as a direct consequence of the prior conventional modular design technologies. From these observations and determinations, it was further determined that cost savings, improved design reuse, and increased network appliance physical layer to PHY-NIM device connectivity options may result from breaking the prior conventional modular design paradigm. It was determined that creating a PHY-NIM device with a separate attachable MAC device may allow a single PHY-NIM device/design to be reused across different network appliance platforms. This would allow the PHY-NIM device to be connected to network appliances that do not have an internal network switch or MAC device by use of the attachable MAC device, and would also allow the same PHY-NIM device to be connected to network appliances that do have an internal network switch or MAC device by direct connection of just the PHY-NIM device to the network appliance. The present subject matter improves modular design and network appliance interconnection to network physical layers by providing for flexibility of use of a single PHY-NIM device design across multiple target network appliance platforms, as described above and in more detail below. As such, improved cost savings and design reuse may be obtained through use of the present technology.

The FIGURE is a block diagram 100 of an example of an implementation of a physical layer network interface module (PHY-NIM) adaptation system. A PHY-NIM device 102 is illustrated, and includes a physical layer circuit board 104. The physical layer circuit board 104 includes one or more Ethernet ports 106 and a serializer/deserializer (SerDes) interface 108. For purposes of the present example, the terms "interconnection," "connector," and "interface" are used interchangeably for purposes of description, though it is understood that an interconnection or interface may also include wiring or printed circuit board traces to interface a connector to other components and other circuitry, and that a connector may form a portion of an interconnection or interface.

The PHY-NIM device 102 may be interconnected to a host network appliance 110 that has a network appliance printed circuit board 112 by direct connection to a SerDes interface 114, as represented by the dashed arrow 116. Alternatively, the PHY-NIM device 102 may be interconnected to a host network appliance 118 that has a network appliance printed circuit board 120 by an adapted connection to a peripheral component interconnection express (PCIe) interface 122.

For the interconnection of the PHY-NIM device 102 to the host network appliance 110, the host network appliance 110 may include one of an internal network switch and a MAC device in a southbridge input/output (I/O) interface chip of the network appliance. As described above, the southbridge chip, in conjunction with a northbridge chip, interfaces different I/O platforms with a central processing unit (CPU) of a computing architecture. The southbridge chip, in conjunction with a northbridge chip, are understood to form a portion of the network appliance printed circuit board 112 circuitry as illustrated.

For the interconnection of the PHY-NIM device 102 to the host network appliance 118, as described herein, the southbridge chip of the network appliance 118 does not have an internal network switch and does not have a MAC device. As such, a MAC device 124 may be provided to perform these I/O functions for the network appliance 118. The MAC device 124 may include a MAC printed circuit board 126 that has a SerDes interface 128 and a PCIe interface 130. As can be seen from the FIGURE, the PHY-NIM device 102 may be interconnected at its SerDes interface 108 to the SerDes interface 128 of the MAC device 124, as represented by the solid arrow 132, to form a sub-assembly 134 that may be interconnected to the host network appliance 118 as represented by the dashed arrow 136. The sub-assembly 134 provides both physical layer and media access control network connectivity functionality for the host network appliance 118. The southbridge chip, in conjunction with a northbridge chip, are understood to form a portion of the network appliance printed circuit board 120 circuitry as illustrated.

As such, the PHY-NIM device 102 may be interconnected to differently configured host network appliances under different interconnection topologies, by use of an attachable and removable MAC device 124. Use of the core design of the PHY-NIM device 102 with the attachable MAC device 124 expands the interface options for the PHY-NIM device 102, and allows a single core design to be utilized across a variety of different network appliance installations. As such, the physical layer network interface module (PHY-NIM) adaptation system may reduce costs, and increase usability of a single core design of the PHY-NIM device.

As described above in association with the FIGURE, the example systems and processes provide a physical layer network interface module (PHY-NIM) adaptation system. Many other variations and additional activities associated with a physical layer network interface module (PHY-NIM) adaptation system are possible and all are considered within the scope of the present subject matter.

Those skilled in the art will recognize, upon consideration of the above teachings, that certain of the above examples are based upon use of one or more programmed processors. However, the invention is not limited to such example embodiments, since other embodiments could be implemented using hardware component equivalents such as special purpose hardware and/or dedicated processors. Similarly, computational microprocessor based computers, micro-controllers, optical computers, analog computers, dedicated processors, application specific circuits and/or dedicated hard wired logic may be used to construct alternative equivalent embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A physical layer network interface module (PHY-NIM) adaptation system, comprising:
    a PHY-NIM device;
    an attachable media access control (MAC) device; and
    where the PHY-NIM device interconnects with the attachable MAC device and the attachable MAC device interconnects to a network appliance to provide at least one of network switch capabilities and MAC device capabilities for use by the network appliance; and
    where the PHY-NIM device interconnects directly to the network appliance without the attachable MAC device where the network appliance comprises at least one of an internal network switch and an internal MAC device in a southbridge input/output (I/O) interface chip of the network appliance.

2. The PHY-NIM adaptation system of claim 1, where:
    the PHY-NIM device comprises a serializer/deserializer (SerDes) interconnection;
    the attachable MAC device comprises a complementary SerDes interconnection;
    the PHY-NIM device and the attachable MAC device interconnect at the SerDes interconnection and the complementary SerDes interconnection as an adaptation platform of the PHY-NIM device; and
    the PHY-NIM device with the attachable MAC device interconnect as a unit to the network appliance.

3. The PHY-NIM adaptation system of claim 2, where:
    the attachable MAC device comprises a peripheral component interconnection express (PCIe) interconnection; and
    the PHY-NIM device with the attachable MAC device interconnect as the unit, using the PCIe interconnection of the attachable MAC device, to the network appliance.

4. A physical layer network interface module (PHY-NIM) device, comprising:
    at least one Ethernet port that provides physical network layer connectivity;
    a serializer/deserializer (SerDes) interconnection; and
    where the SerDes interconnection:
        provides connectivity of the PHY-NIM device to an attachable media access control (MAC) device and the attachable MAC device interconnects to a network appliance to provide at least one of network switch capabilities and MAC device capabilities for use by the network appliance; and
        provides connectivity of the PHY-NIM device directly to the network appliance where the network appliance comprises at least one of an internal network switch and an internal MAC device in a southbridge input/output (I/O) interface chip of the network appliance.

5. The PHY-NIM device of claim 4, where:
    the PHY-NIM device attaches to the attachable MAC device using a complementary SerDes interconnection of the attachable MAC device; and
    the PHY-NIM device with the attachable MAC device interconnect as a unit to the network appliance.

6. The PHY-NIM device of claim 5, where:
    the PHY-NIM device with the attachable MAC device interconnect as the unit, using a peripheral component interconnection express (PCIe) interconnection of the attachable MAC device, to the network appliance.

7. A media access control (MAC) device, comprising:
    a serializer/deserializer (SerDes) interconnection;
    a peripheral component interconnection express (PCIe) interconnection; and
    where:
        the MAC device interconnects using the SerDes interconnection as an attachable MAC device to a physical layer network interface module (PHY-NIM) device, and the MAC device with the interconnected PHY-NIM device interconnect as a unit to a network appliance to provide at least one of network switch capabilities and MAC device capabilities for use by the network appliance; and
        the MAC device is directly connectable to the network appliance via the PCIe interconnection to interconnect the unit to the network appliance.

* * * * *